No. 660,213. Patented Oct. 23, 1900.
J. E. FROST.
HEATER.
(Application filed Apr. 2, 1897.)
(No Model.) 2 Sheets—Sheet 1.
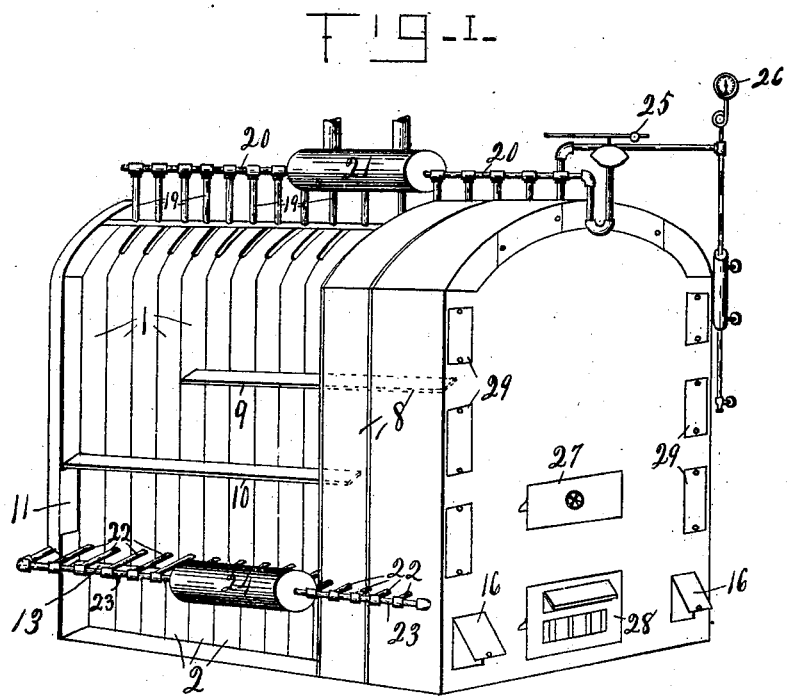
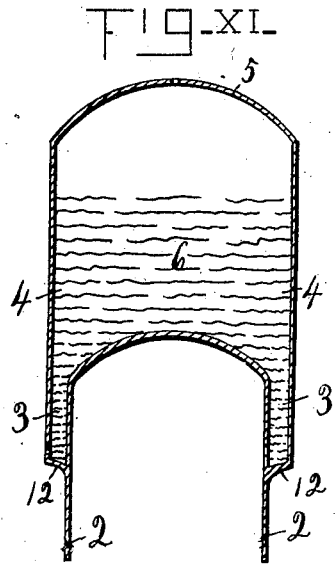 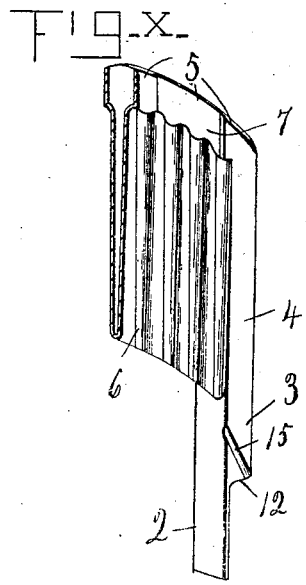 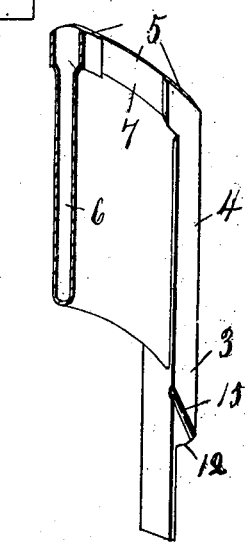
WITNESSES:
Cl. Schoeneck
L. F. Weisburg
INVENTOR.
John E. Frost
BY Alfred Wilkinson
ATTORNEY.

No. 660,213. Patented Oct. 23, 1900.
J. E. FROST.
HEATER.
(Application filed Apr. 2, 1897.)
(No Model.) 2 Sheets—Sheet 2.
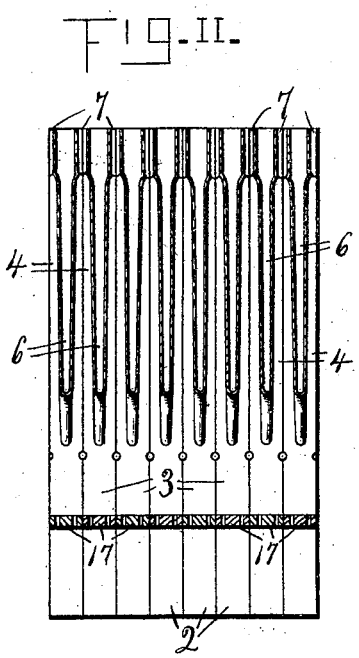
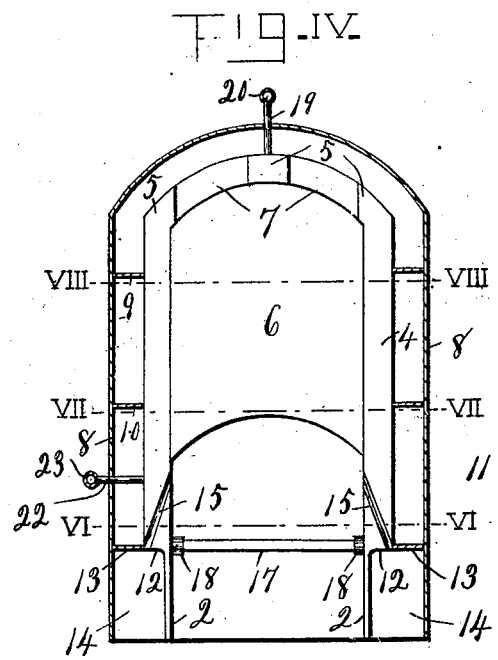
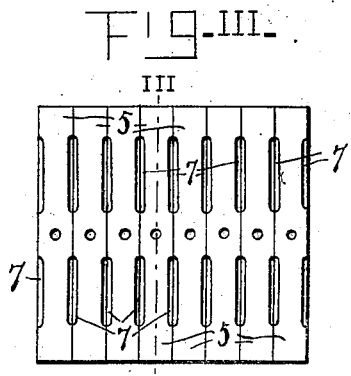
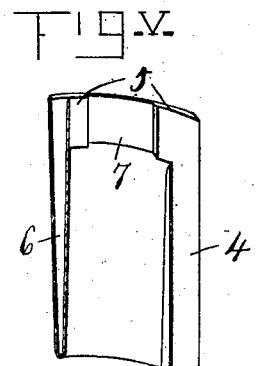
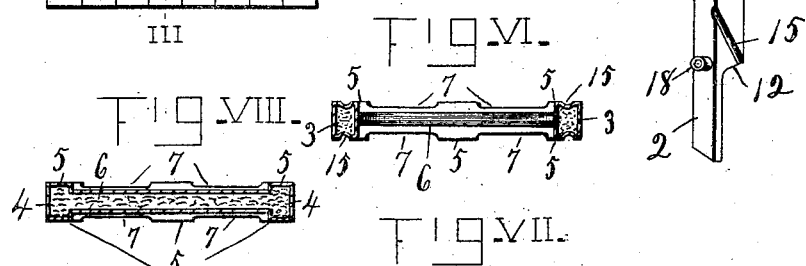
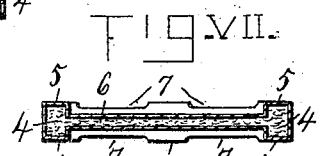
WITNESSES:
O. C. Schoeneck
L. F. Weisburg
INVENTOR.
John E. Frost
BY
Alfred Wilkinson
ATTORNEY.
THE NORRIS PETERS CO., PHOTO-LITHO., WASHINGTON, D. C.

UNITED STATES PATENT OFFICE.

JOHN EMORY FROST, OF WATKINS, NEW YORK.

HEATER.

SPECIFICATION forming part of Letters Patent No. 660,213, dated October 23, 1900.

Application filed April 2, 1897. Serial No. 630,408. (No model.)

*To all whom it may concern:*

Be it known that I, JOHN EMORY FROST, a citizen of the United States, residing at Watkins, in the county of Steuben and State of New York, have invented a new and useful Improvement in Heaters; and I do hereby declare that the following, in connection with the accompanying drawings, is a full, clear, and exact description of the invention.

My invention relates to hot-water or steam heaters by which hot water or steam is put in circulation through buildings to heat them; and it consists in a new form and arrangement of parts whereby the largest water-surface is brought in direct contact with the fire, more perfect circulation of water and of products of combustion is effected with economy and efficiency of fuel, the smoke and soot are largely consumed, the boiler is easily cleaned and kept clean, and the whole heater is easy and simple to construct and to assemble.

My invention will be understood by reference to the accompanying drawings and specification, in which the same numerals of reference indicate the same parts in all the views.

Figure I is a perspective view of one of my heaters made of several sections, a portion of the casing being removed. Fig. II is a vertical longitudinal section of several assembled sections on line II II of Fig. I. Fig. III is a top plan view of Fig. II. Fig. IV is a cross-section of the heater, showing the boiler-section in elevation. Fig. V is a perspective view, partly in section, of one-half of the section shown in Fig. IV. Fig. VI is a horizontal cross-section of a section taken on line VI VI of Fig. IV looking up. Fig. VII is a similar section on line VII VII. Fig. VIII is a similar section on line VIII VIII. Figs. IX and X are views corresponding to Fig. V, showing simple modifications in the form of the sections. Fig. XI is a vertical section of a boiler-section on line XI XI of Fig. III.

My boiler is composed of any desirable number of similar vertical boiler-sections 1 1, of cast metal, made in the form of an inverted U, with legs 2 2 forming sides of ash-pit, water-legs 3 3 forming sides of fire-box, and a main water-space composed of side water-spaces 4 4, crown 5, and central water-space 6, which, preferably of wedge form, depends from crown and extending across the section (arching over the fire) connects the side spaces. Where the boiler is used for the generation of steam, the crown and upper portions of side and central spaces become the steam-space. Recesses 7 7 in the crown form, when the sections are assembled, openings for products of combustion to pass through upwardly and thence around the exterior of the boiler within the casing 8, within which are arranged horizontal baffle-plates 9 and 10, by which the products of combustion are turned first back, then forward, then back again, passing out through the smoke-flue 11 at base of heater. In combination with the outer overhang 12 of the sections are arranged plates 13 13, forming air-flues 14 14 between the legs 2 2 and the jacket, from which lead jet-tubes formed by corresponding grooves 15 15 in the adjacent faces of the sections, through which jets of heated air are admitted to promote combustion, being controlled by dampers 16 16, operated by hand or automatically. Steam also may be admitted through these jet-tubes with the heated air.

My heater is provided with the other necessary parts, grate formed of sections 17 17, held in bearings 18 18, nipples 19 19, tapped into the top of the sections and leading to steam-pipe 20 and steam-drum 21, also the side nipples 22 22, leading from return water-pipe 23 and water-drum 24. By these nipples and pipes the sections of the boiler are secured together and in position.

25 is the safety-valve, 26 the gage, 27 the feed-door, 28 the ash-pit door, and 29 29 the clean-out doors.

The jacket is preferably made in sections, which may be, as here shown, of two widths, equal, respectively, one to the width of two boiler-sections, the other to the width of three, by which the jacket may be made of a size for any desired number of boiler-sections.

The central water-space may be varied in form without departing from my invention, with parallel sides, as shown in Fig. IX, or corrugated, as shown in Fig. X, to expose a larger heat-absorbing surface to the direct action of the fire. The top openings through the crown formed by recesses 7 7 may be of various sizes and shapes, but preferably elongated, as here shown.

It is well known that "fire-surface" is more important than "flue-surface"—that is, that a large expanse of boiler-surface brought in direct contact with the fire is better than surface brought in contact with the products of combustion after they have passed away from the fire into the flues. In flues the products of combustion are liable to be excessively cooled and the flues themselves choked by soot. It is also important that the flow of water should be direct, unimpeded by diaphragms, turns, and corners in order to circulate as rapidly as possible, absorbing the greatest number of units of heat. In my invention these advantages are obtained in a high degree in a simple form of heater, which may be easily made of any desired capacity by the addition of a desirable number of boiler-sections. The ease with which the size of the boiler may be increased by the addition of similar sections is convenient and economical for the manufacturer, dealer, and purchaser.

The products of combustion pass upwardly from the fire through the gradually-contracting combustion-chambers formed between the central water-spaces and out through the openings in the crown, whence they pass back and forth around the top and sides of the boiler, enveloping it to a sufficient extent. By this arrangement is effected a maximum combustion of gases and smoke and a minimum deposit of soot. The soot which is deposited on the surfaces immediately above the fire drops and is consumed. Comparatively little will be deposited on the exterior of the boiler and may be easily reached through the clean-out doors.

By the admission of the heated air and, when desired, a limited amount of steam through the jet-tubes a more perfect combustion is effected, combustion of the gases and smoke being promoted and regulated. On account of its more perfect combustion and the consuming of the soot and smoke my heater may be used for various kinds of fuel—hard or soft coal, wood, and coke. When soft coal is used, more air should be admitted through the jet-tubes; when hard coal, less. Its construction permitting an unimpeded and rapid flow of water also permits easy drainage.

Having thus fully described my invention, what I claim, and desire to protect by Letters Patent, is—

1. In a steam or hot-water heater, similar boiler-sections having in combination vertical side water-spaces, an upper water-space or steam-space, connecting the side spaces and of the same thickness, a central water-space of less thickness, extending between the side spaces and communicating therewith and with the steam-space, recesses in the side walls of said steam-space, forming when the sections are assembled outlets for the products of combustion, substantially as described and shown.

2. In a steam or hot-water heater similar boiler-sections having in combination vertical side water-spaces, an upper water-space or steam-space connecting the side spaces and of the same thickness, a central water-space of less thickness extending between the side spaces and communicating therewith and with the steam-space, recesses in the side walls of said steam-space, forming when the sections are assembled outlets for the products of combustion, and recesses in the said side water-spaces forming jet-flues for the introduction of air into the combustion-chamber.

3. In a hot-water or steam heater, a series of boiler-sections having in combination vertical water-spaces on each side, an upper water space or crown, a wedge-shaped water-space, communicating with said side spaces and said upper space and extending downwardly from said upper space toward the fire; recesses in said crown, and recesses in the sides of said vertical water-spaces, forming when the sections are assembled respectively outlets for the products of combustion and inlets for air.

4. In a heater, the combination of a metallic casing, similar boiler-sections having solid legs and outwardly-overhanging water-spaces, and plates arranged horizontally in combination with said overhang to form a hot-air flue within the casing, and upwardly-inclining jet-tubes leading from said hot-air flue to the combustion-chamber for the introduction of hot air.

5. In a steam or hot-water heater, similar boiler-sections having in combination vertical side water-spaces, a superior water-space or steam-space connecting the side spaces and of the same thickness, a central water-space of less thickness, extending between the side spaces and communicating therewith and with the steam-space, recesses in the side walls of said steam-space, forming when the sections are assembled outlets for the products of combustion, and recesses in the front and rear walls of the lower ends of said side spaces forming upwardly and inwardly inclined jet-flues for conducting hot air from a hot-air flue within the jacket to the combustion-chamber.

6. In a heater, the combination of a metallic casing, horizontal baffle-plates arranged on each side between the boiler and the casing, a lower horizontal plate forming a hot-air flue between the legs of the boiler and the casing; similar boiler-sections comprising solid legs, vertical side water-spaces, and a steam space or crown connecting said side spaces, all of the same width, and a central water-space extending downwardly from said steam-space toward the fire and communicating therewith and with said side spaces; elongated recesses in front and rear walls of said steam-space, and upwardly-inclined recesses in the front and rear faces of said side spaces, said recesses forming when the sections are assembled respectively outlets for the products of combustion above and inlets for the admission of hot air from said hot-air flue to the combustion-chamber, substantially as described and shown.

In witness whereof I have hereunto set my hand, in the presence of two attesting witnesses, at Syracuse, in the county of Onondaga, in the State of New York, this 2d day of March, 1897.

JOHN EMORY FROST.

Witnesses:
  C. C. SCHOENECK,
  L. F. WEISBURG.